(12) United States Patent
Cook et al.

(10) Patent No.: US 8,020,173 B2
(45) Date of Patent: *Sep. 13, 2011

(54) METHOD AND SYSTEM FOR ASSOCIATING PARAMETERS OF CONTAINERS AND CONTAINED OBJECTS

(75) Inventors: Jay Cook, Costa Mesa, CA (US); William J Drummy, Cowan Heights, CA (US); Keyee Hsu, Irvine, CA (US); Rashesh Mody, San Clemente, CA (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/608,897

(22) Filed: Oct. 29, 2009

(65) Prior Publication Data

US 2010/0115531 A1    May 6, 2010

Related U.S. Application Data

(63) Continuation of application No. 10/939,109, filed on Sep. 10, 2004, now abandoned, which is a continuation of application No. 09/241,938, filed on Feb. 1, 1999, now Pat. No. 6,810,522.

(60) Provisional application No. 60/103,362, filed on Oct. 7, 1998.

(51) Int. Cl.
*G06F 9/44* (2006.01)
*G06F 3/048* (2006.01)

(52) U.S. Cl. ............ 719/316; 717/116; 715/763

(58) Field of Classification Search ............ 719/310, 719/316, 318; 709/224, 236; 717/116; 715/763
See application file for complete search history.

(56) References Cited

U.S. PATENT DOCUMENTS

| | | | |
|---|---|---|---|
| 5,243,594 A | 9/1993 | Dasch et al. | |
| 5,301,326 A | 4/1994 | Linnett et al. | |
| 5,404,528 A | 4/1995 | Mahajan | |
| 5,432,903 A | 7/1995 | Frid-Nielsen | |
| 5,440,741 A | 8/1995 | Morales et al. | |
| 5,485,617 A | 1/1996 | Stuz et al. | |
| 5,603,034 A | 2/1997 | Swanson | |
| 5,715,413 A | 2/1998 | Ishai et al. | |
| 5,754,175 A | 5/1998 | Koppolu et al. | |
| 5,815,703 A | 9/1998 | Copeland et al. | |
| 5,822,527 A | 10/1998 | Post | |
| 5,844,554 A | 12/1998 | Geller et al. | |
| 5,862,395 A | 1/1999 | Bier | |
| 5,867,707 A | 2/1999 | Nishida et al. | |
| 5,870,088 A | 2/1999 | Washington et al. | |
| 5,873,106 A * | 2/1999 | Joseph | 715/203 |

(Continued)

OTHER PUBLICATIONS

Claverie, Steven D., "Working the 'Net: Devloping Appliations with the Internet Information Server and Visual Basic ActiveX Controls," ACM, Apr. 1998, p. 158-162.

(Continued)

*Primary Examiner* — Van H Nguyen
(74) *Attorney, Agent, or Firm* — Conley Rose, P.C.

(57) ABSTRACT

A system and method for establishing associative relationships between properties of a contained object and corresponding parameters of a container application is disclosed herein. In one embodiment the present system contemplates the establishment of both mutual and unilateral associative relationships, with a particular relationship being specified via a user interface created upon instantiation of the contained object. The associative relationships may be advantageously established without modification of the code comprising the contained object.

5 Claims, 6 Drawing Sheets

U.S. PATENT DOCUMENTS

| | | |
|---|---|---|
| 5,878,260 A | 3/1999 | Copeland et al. |
| 5,911,068 A | 6/1999 | Zimmerman et al. |
| 5,917,730 A | 6/1999 | Rittie et al. |
| 5,933,601 A | 8/1999 | Fanshier et al. |
| 5,951,680 A | 9/1999 | Redlin et al. |
| 5,963,958 A | 10/1999 | Cottrill |
| 5,974,410 A | 10/1999 | Copeland et al. |
| 6,035,119 A | 3/2000 | Massena et al. |
| 6,049,799 A | 4/2000 | Manget et al. |
| 6,049,831 A | 4/2000 | Gardell et al. |
| 6,091,893 A * | 7/2000 | Fintel et al. ............... 703/6 |
| 6,178,432 B1 | 1/2001 | Cook et al. |
| 6,263,339 B1 | 7/2001 | Hirsch |
| 6,282,547 B1 | 8/2001 | Hirsch |
| 6,289,395 B1 | 9/2001 | Apte et al. |
| 6,337,696 B1 | 1/2002 | Lindhorst et al. |
| 6,810,522 B2 * | 10/2004 | Cook et al. ............. 719/316 |
| 6,834,388 B1 | 12/2004 | Elsbree |
| 6,915,301 B2 | 7/2005 | Hirsch |

OTHER PUBLICATIONS

PCT/US99/23159 ISR mailed Aug. 7, 2000.
U.S. Appl. No. 09/241,938 Non-Final Rejection mailed Dec. 28, 2000.
U.S. Appl. No. 09/241,938 Non-Final Rejection mailed Jun. 19, 2001.
U.S. Appl. No. 09/241,938 Final Rejection mailed Sep. 20, 2001.
U.S. Appl. No. 09/241,938 Non-Final Rejection mailed Mar. 1, 2002.
U.S. Appl. No. 09/241,938 Final Rejection mailed Jan. 2, 2003.
U.S. Appl. No. 09/241,938 Final Rejection mailed Nov. 18, 2003.
U.S. Appl. No. 10/939,109 Non-Final Rejection mailed Apr. 30, 2008.
U.S. Appl. No. 10/939,109 Final Rejection mailed Apr. 29, 2009.

* cited by examiner

METHOD AND SYSTEM FOR ASSOCIATING PARAMETERS OF CONTAINERS AND CONTAINED OBJECTS

CROSS-REFERENCE TO RELATED APPLICATIONS

This application is a continuation of and claims priority to U.S. patent application Ser. No. 10/939,109, filed Sep. 10, 2004, now abandoned entitled METHOD AND SYSTEM FOR ASSOCIATING PARAMETERS OF CONTAINERS AND CONTAINED OBJECTS, which is a continuation of U.S. patent application Ser. No. 09/241,938, filed Feb. 1, 1999, now U.S. Pat. No. 6,810,522, entitled METHOD AND SYSTEM FOR ASSOCIATING PARAMETERS OF CONTAINERS AND CONTAINED OBJECTS, which claims priority to U.S. Provisional Patent Application Ser. No. 60/103,362, filed Oct. 7, 1998, entitled METHOD AND SYSTEM FOR ASSOCIATING PARAMETERS OF CONTAINERS AND CONTAINED OBJECTS. The content of each of these applications is hereby incorporated by reference herein in its entirety for all purposes.

FIELD OF THE INVENTION

This invention relates generally to data processing systems and, more particularly, to a method and system for creating associations between parameters of a container application program and corresponding parameter of a contained object.

BACKGROUND

The operation of a computer system is controlled by a computer program or group of programs called the operating system ("OS"). In early operating systems, a computer user input text commands to the OS using a command line interface. Later, more advanced operating systems were developed which utilized a graphical user interface ("GUI") in combination with an input device such as a mouse. In GUIs, the input device controls a display cursor to allow for the selection of data and resources for application program operations. A user selects an operation by highlighting an item or field and pressing a graphical input device button.

Many GUI programs are implemented in object-oriented programming languages, such as the C++ programming language. The display icons that represent data or resources are typically representations of data structures called objects, which encapsulate attributes and behaviors. Objects are specified by definitions, called classes, that specify the attributes and behaviors of the particular objects, which are termed "instantiations" of the class definitions. The reference Budd, T., "An Introduction to Object-Oriented Programming", Addison-Wesley Publishing Co., Inc. 1991, provides an introduction to object-oriented concepts and terminology.

Object-oriented programming languages make it easier for system programmers to implement the GUI concepts of icons and lists. For example, if the GUI icons are represented as object-oriented programming objects, the GUI program can be written so that the status of the icon is continuously updated. In this way, it is relatively simple for the GUI program to be written so that the icons can be selected with the graphical user input device and moved about on the computer system display as desired.

With the advent of object-oriented GUIs also came object oriented developing environments. Such development environments are computer programs or groups of computer programs that allow a software developer to create object oriented programs. Object-oriented development environments typically have a palette of objects with which the developer builds an application. Each object on this palette is different and serves as a template for the developer. A palette object's attribute settings are the default settings for that object. To use an object on the palette, the developer copies the object and places the copy on the application. The copied or "derived" object has the same attribute settings as the original palette object.

Efforts have been made to establish a common method of communication between objects instantiated within a given operating system environment. For example, Microsoft Corporation has established a certain protocol, known as the Component Object Model, which governs the interaction between software objects within the Microsoft Windows operating environment. COM provides a standard framework permitting objects from different applications to share data and functions, and permits a given application program ("container application") to contain multiple objects of different types. Recently, a format for control objects known as "ActiveX" has been established to take advantage of the COM protocol. An ActiveX object behaves as a "server" relative to its container application, which in turn behaves as a "client". The COM protocol manages, among other things, the setup and initialization necessary for container applications to send and receive messages and data to and from server applications.

An ActiveX control is an object which typically includes data and functions, and which is capable of notifying its container application of the occurrence of an event. In the context of an ActiveX control, stored data members are known as "properties", functions are referred to as "methods", and event occurrences are denoted as "events". Properties can be read from, and written to, an ActiveX control via associated methods. The interface of an ActiveX control is a set of methods defining certain input, output and behavior rules. Accordingly, a container application can invoke the methods of an ActiveX control to effect the defined behavior and access the object data.

In addition to representing data stored by an ActiveX control, properties are used in formatting the display of an ActiveX control. Events are utilized to notify a container application of the occurrence of an event, as well as to pass parameters relevant to the particular event. For example, an ActiveX control is capable of informing its container application of the occurrence of a selection event (e.g., when the user interface of the control has been "clicked on").

ActiveX objects are typically implemented: (i) as in-process servers, or (ii) as out-of-process servers. In the former case the ActiveX control is implemented as a Dynamic Link Library ("DLL"), and in the latter case as an "executable". ActiveX DLL's are loaded into the process space of the container application. As a consequence, data does not need to be transported between the container application and the ActiveX control. In contrast, ActiveX executables are loaded into a separate process space from the container application. Since there is no shared memory between such applications, data is transported between ActiveX objects and the container application. This is advantageous in the sense that an ActiveX executable does not interfere with the processing of data in the client application.

Although a number of programming environments exist for facilitating development of Active X controls, as object-oriented constructs each such ActiveX control operates independently of the container application. That is, Active X controls are conventionally installed in container applications so as not to be affected by changes in parameters of the container application, and vice versa. Similarly, the occurrence of ActiveX events does not automatically cause the execution of scripts or the like in the container application. Although such relationships between the properties and events of an ActiveX control and a container application could conceivably be established on an ad hoc basis, there has not heretofore been a convenient mechanism for linking such properties and events with associated parameters of container applications.

SUMMARY

Briefly, the present invention provides a system and method for establishing associative relationships between properties of a contained object and corresponding parameters of a container application. The present system contemplates the establishment of both mutual and unilateral associative relationships, with a particular relationship being specified via a user interface created upon instantiation of the contained object. It is a feature of the present invention that such associative relationships may be established without modification of the code comprising the contained object.

In one aspect the present invention facilitates implementation of selected functionality of a container application prescribed by an event script. In an initial step an association is created between an event arising within a contained object instantiated in a computing environment and a script associated with the container application. In a preferred implementation this association is recorded in an event sink of a control site serving the container application. An event indication is generated in response to occurrence of a particular event within the contained object. In response, the event script is invoked and a sequence of script commands corresponding to the selected functionality are carried out.

In another aspect the present invention provides a system and method for creating an association between a tag source of a container application and a property of a contained object. Specifically, an associative relationship is defined between said tag source and the property, such associative relationship being determinative of the extent to which changes in the tag source and property will induce corresponding changes in the other. This associative relationship is recorded within a property sink of a control site for the container application, and may be specified by a user upon instantiation of the contained object. Depending upon the nature of the tag source, various unilateral and mutual associative relationships may be established. For example, in certain instances a unilateral associative relationship may be specified such that changes in the tag source are reflected as corresponding changes in the property, while changes in the property are not permitted to affect the tag source. In other cases the converse unilateral associative relationship, or a mutual associative relationship, may also be specified.

Additional aspect of the present invention are further described below in conjunction with the appended Drawings.

DETAILED DESCRIPTION OF EMBODIMENTS OF THE INVENTION

Overview

The present invention provides a generalized method for creating associations between parameters of programming objects, such as ActiveX controls, and associated parameters of a container application. That is, properties and events of ActiveX controls are respectively bound to data variables (i.e., "tags") and scripts of the container application. The container application could comprise, for example, industrial automation and control software having tags representative of the state of various sensors or industrial processes. Scripts of the container application include a sequence of script commands for invoking functionality of the container application, thereby allowing a user to specify how the application operates.

Figure 1:
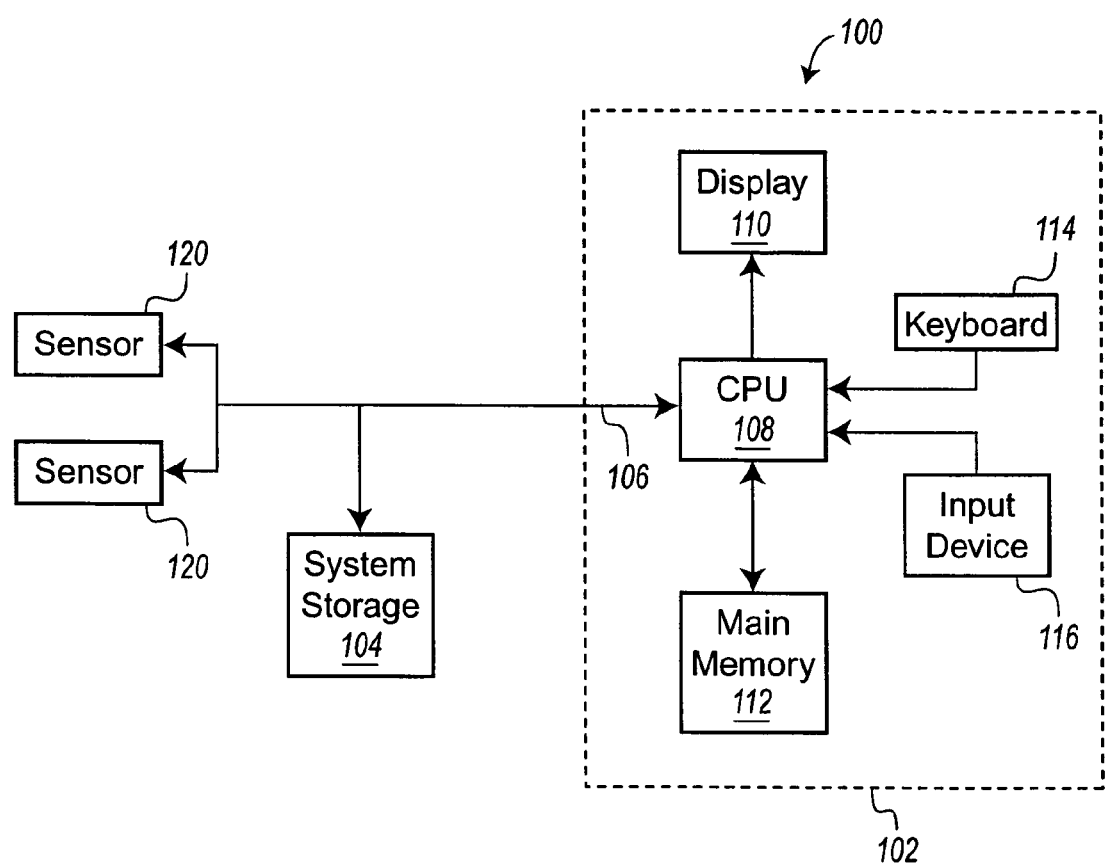
FIG. 1 is a block diagram of a computer system in which the present invention may be implemented.

FIG. 1 is a block diagram of a computer system 100 in which, the present invention may be implemented. The computer system 100 includes a user station 102 that communicates with a system storage unit over network 106. The system storage unit 104 comprises a direct access storage device, such as magnetic disk storage, in which data files are stored. The user station 102 includes a central processing unit ("CPU") 108, a display 110, and a main memory 112. The CPU operates in response to user commands, which it receives via a keyboard 114 or graphical user input device 116. The user station 102 can communicate with one or more other user stations or a network server unit over the network 106.

The main memory 112 contains a variety of data structures and information, including an operating system, application programs, program objects, and user data. The main memory is represented as a single entity, but those skilled in the art will appreciate that the main memory can comprise a combination of random access memory ("RAM"), hard disk drives, optical disk drives, and other storage devices containing logically segmented storage locations. The main memory includes a computer program containing a sequence of program instructions whose execution implements the present invention.

The operating system contained in the memory 112 supports an object-oriented programming environment for the execution of object-oriented programs, such as those written in, for example, the C++ programming language. Accordingly, the memory contains program objects that are data structures of an object-oriented programming language. Application programs are invoked, or launched, by a user through the keyboard 114 or graphical input device 116. The application programs can be written in a variety of languages, including C++.

The display 110 comprises a display device such as a video terminal that displays computer output and indicates system operations. Display objects can be pictured on the display and the user can designate data operations on the display by using the input device 116 or equivalent graphical user input device.

In an exemplary implementation the computer system 100 may also send commands to, and receive data from, one or more industrial sensor or process control devices 120. The state of each such device 120 is reflected by the value of an associated tag, each of which may be a parameter of the container application. In the exemplary implementation the container application comprises an industrial automation software program, such as the InTouch program module developed by Wonderware Corporation of Irvine, Calif. The Wonderware Intouch module includes a tool kit for building screens and interfaces, and a graphical user interface for monitoring and controlling the devices 120. For example, in the context of electrical distribution the software toolkit of the Wonderware Intouch module enables rapid development of three dimensional representations of electrical distribution switchgear. The switchgear elevational representations have logical connections to the switchgear devices. An elevation can be modified to any dimensions with an essentially infinite number of combinations and arrangements of meters and protection devices to quickly and accurately represent a customer's switchgear. In addition, a tabular representation of metering and setup/set point information is generated automatically with the appropriate database server links established. The Wonderware Intouch module is disposed to provide similar representations and accompanying database links in other areas of industrial automation and control.

Display and Editing of Associative Relationships

Figure 2:
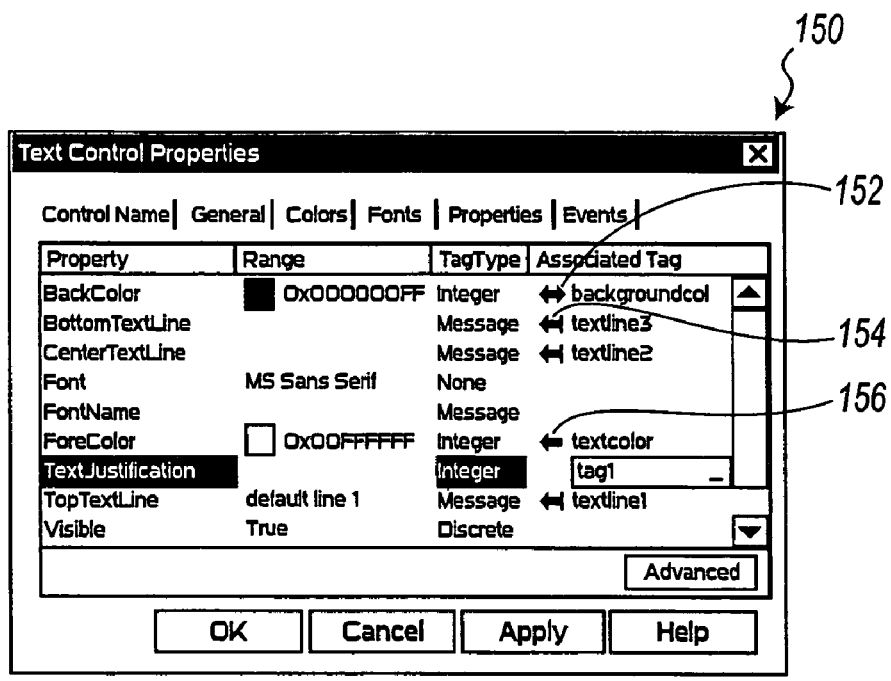
FIG. 2 is a diagram of a dialog box for a bound object which has been instantiated in a container application in accordance with the present invention.

FIG. 2 is a diagram of a dialog box 150 for a bound object which has been instantiated in a container application as described hereinafter. In the exemplary implementation of FIG. 2, the bound object comprises an ActiveX control identified as TextControl. When instantiated in a container application using conventional techniques, the dialog box 150 could be expected to include the "Control Name", "General", "Colors" and "Fonts" pages. In accordance with the invention, a "properties" page is included to provide a mechanism for viewing and altering relationships between properties of the bound object (i.e., TextControl) and corresponding tags of the container application. In addition, an "events" page serves to display the relationship between various events of the bound object and associated scripts of the container application.

Referring to FIG. 2, the properties page of TextControl reveals that the property BackColor is bound to the tag backgroundcolor of the container application. The arrow graphic 152 indicates that a bidirectional relationship has been established between the property BackColor and the associated tag backgroundcolor. That is, changes in the value of the tag backgroundcolor will be reflected in the value of the property BackColor, and vice versa.

FIG. 2 also indicates that the property BottomTextLine is bound to the tag textline3 of the container application. The arrow graphic 154 indicates that changes to the tag textline3 will result in corresponding changes being made to the property BottomTextLine. The solid vertical line at the right edge of the arrow graphic 154 indicates that a user will not be permitted to define the relationship between BottomTextLine and textline3 such that changes to the former induce corresponding changes to the latter. This situation may arise when, for example, the tag textline3 is "read only", or when there exists some other reason why it is impermissible to bind the tag textline3 to the property BottomTextLine.

It is also seen that that the property ForeColor is bound to the tag textcolor of the container application. The arrow graphic 156 indicates that changes to the tag textcolor will result in corresponding changes being made to the property ForeColor. The absence of a right-pointing arrow in arrow graphic 156 indicates that changes to ForeColor will not affect the value of textcolor. Since a solid vertical line does not appear at the right edge of the arrow graphic 156, a user will be permitted to allow changes in the property ForeColor to cause corresponding changes in the tag textcolor.

FIG. 2 further shows the property TextJustification to be bound to the tag tag1. However, the absence of any arrow graphic proximate the displayed name tag1 indicates that changes to the property TextJustification will not induce changes in the tag tag1, nor vice versa.

Figure 3:
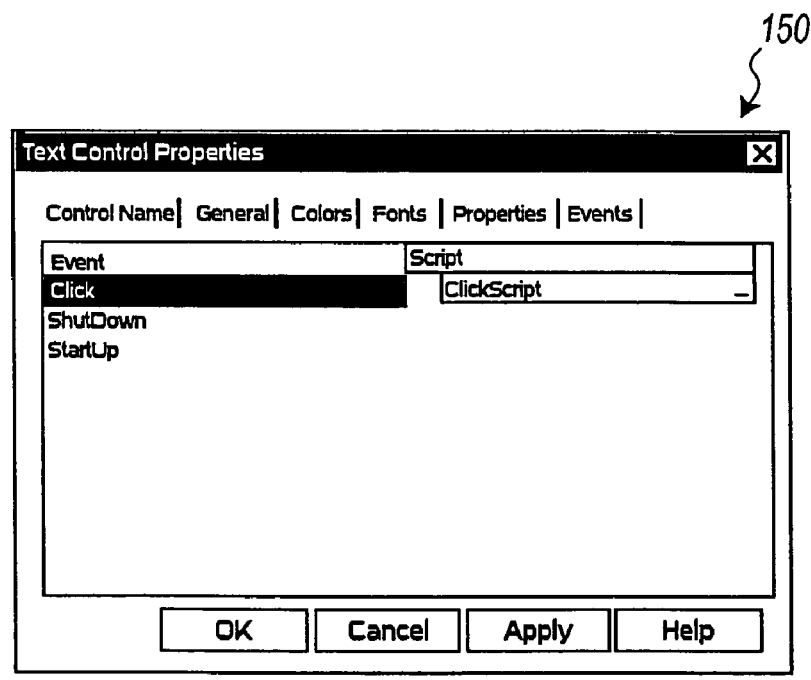
FIG. 3 provides a view of the dialog box of FIG. 2 in which the events page has been selected.

FIG. 3 provides a view of the dialog box 150 in which the events page has been selected. This view reveals that the event Click is bound to the script ClickScript of the container application. In the exemplary implementation of FIG. 3 no further graphic representation is provided of the binding between the event Click and the property ClickScript.

Referring again to FIG. 2, the associations between the parameters of the bound objects and corresponding tags of the container application may be modified by using the graphical input device 116 to change the state of the applicable arrow graphic. For example, in a particular implementation each arrow graphic will cycle between various permitted associative states (e.g., unidirectional, bidirectional) in response to repeated selection by the device 116.

Establishment of Associative Relationships Between Corresponding Parameters

In a preferred embodiment, the binding between a container application and a bound object is implemented using the capability of the underlying window system. The present invention is described assuming, for exemplary purposes and without limitation, that the underlying window system is similar to the Microsoft Windows 3.1 operating system ("Windows"). Except as otherwise noted hereinafter, conventional techniques are utilized to install objects (e.g., an ActiveX control) within the Windows environment for subsequent binding to a container application in accordance with the invention. Once an object has been installed, the process of binding an object to a container application in accordance with the invention is initiated by instantiating the installed object in the container application.

In an exemplary embodiment the container application comprises an object-oriented industrial automation program such as, for example, the InTouch program developed by Wonderware Corporation of Irvine, Calif. In this exemplary embodiment the container application creates windows which themselves function as containers for ActiveX control objects. After a control object has been placed in such a window and its parameter associations have been selected via a dialog box (FIG. 2), the window may be saved and closed in response to commands provided to the container application. A compiling operation is preferably invoked when the container window and contained control object are saved, thereby creating a "compiled window". The container window and contained control object may then be generated from the compiled window during subsequent execution of the container application.

Upon such placement of an installed object in a window of the container application, a dialog box such as that shown in FIG. 2 is presented via display 110. The desired associations between properties of the installed object and tags of the container object may then be selected via pointing device 116 so as to create a bound object. Once one or more installed objects have been so bound to the container application, the window of the container may be compiled with the bound objects so as to create a "compiled window". During execution of the container application the compiled window is read and interpreted, which results in the creation of the bound object within the run-time environment. In a preferred implementation the compiled window is stored as a file of predefined format, in which each object (e.g., shapes, wizard utilities, ActiveX controls) present within the window of the container application is represented as a block of data. Utilization of a particular predefined format for the compiled window file is not necessary for implementation of the present invention, and differing file formats for the compiled window may offer advantages in particular applications.

Figure 4:
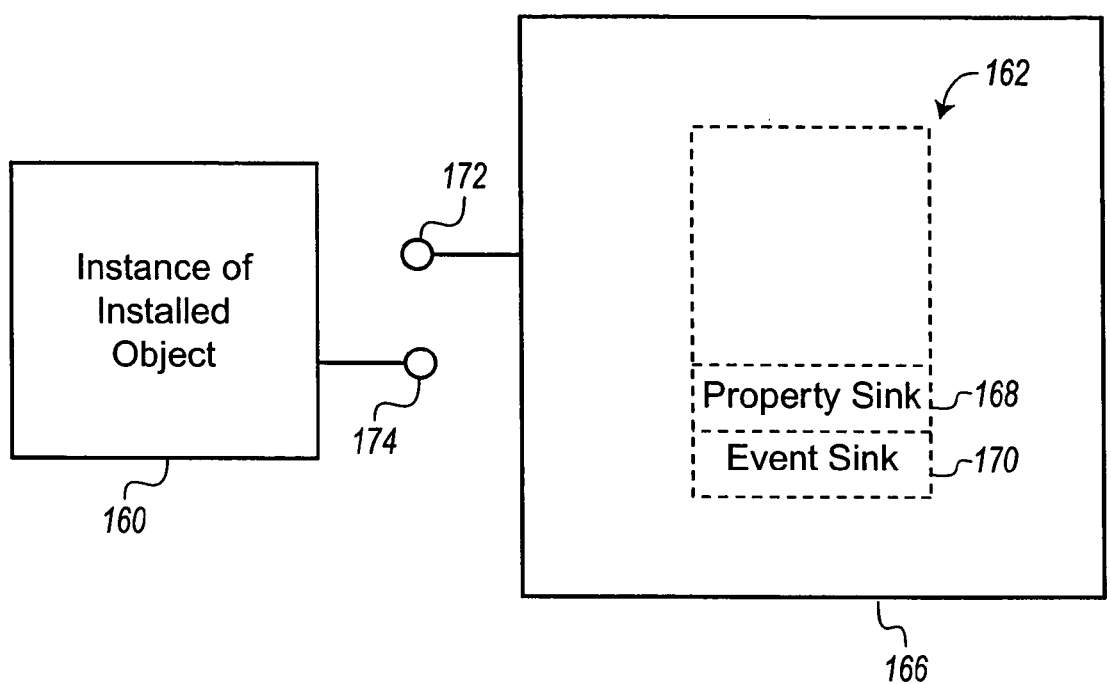
FIG. 4 provides a graphical representation of an instance of an installed object and the resulting control site established within a window of a container application as a consequence of such instantiation.

FIG. 4 provides a graphical representation of an instance 160 of an installed object and the resulting control site 162 established within a window 166 of a container application as a consequence of such instantiation. Those skilled in the art will appreciate that a standard control site having certain well defined properties is generated upon placement of an object such as an ActiveX control within a window of a Windows compatible container application. In accordance with the invention, the control site 162 differs from such a standard control site in that sets of one or more property sinks 168 and event sinks 170 are provided to facilitate the parameter associations depicted in FIGS. 2 and 3. The control site 162 defines a standard interface 172 for communicating with the instantiated object 160 through a corresponding standard interface 174 thereof.

Figure 5:
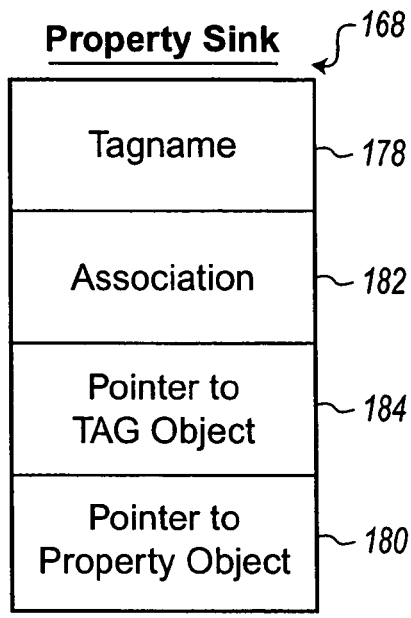
FIG. 5 shows a block diagram of the structure of a property sink included within the control site of FIG. 4.

Referring to FIG. 5, there is shown a block diagram of the structure of a property sink 168 included within the control site 162. The property sink 168 defines a tagname field 178 for identifying the name of the tag to be associated with the property object specified by the pointer within the field 180. An association field 182 specifies the type of association (e.g., unidirectional) to be established between the tag object and property object identified by the pointers within the fields 184 and 180, respectively. In the exemplary case of FIG. 5, the association field 182 would specify a unidirectional relationship between the tag object textcolor and the property object TextJustification. The association field 182 registers any change in the relationship between a tag object and corresponding property object effected using the pointing device 116 in the manner described above with reference to FIG. 2.

Figure 6:
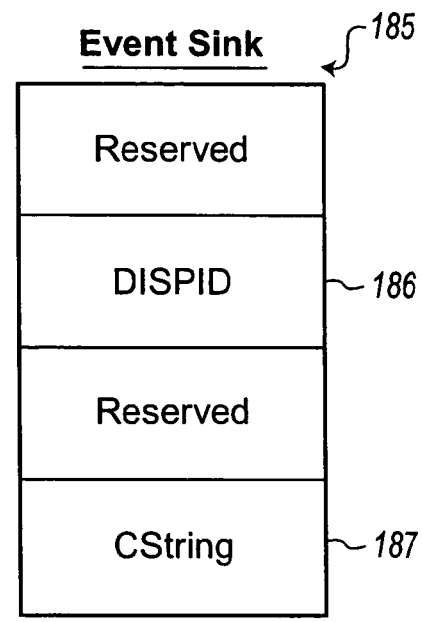
FIG. 6 shows a block diagram of the structure of an event sink included within the control site of FIG. 4

FIG. 6 shows a block diagram of the structure of an event sink 185 included within the control site 162. The event sink 185 defines a DISPID field 186 containing an identifier corresponding to a given event. In addition, a CString field 187 is provided for storing the name of a script for the container application associated with the event. The name in the CString field is provided to the container application in response to occurrence of the given event, which executes the corresponding script.

Figure 7:
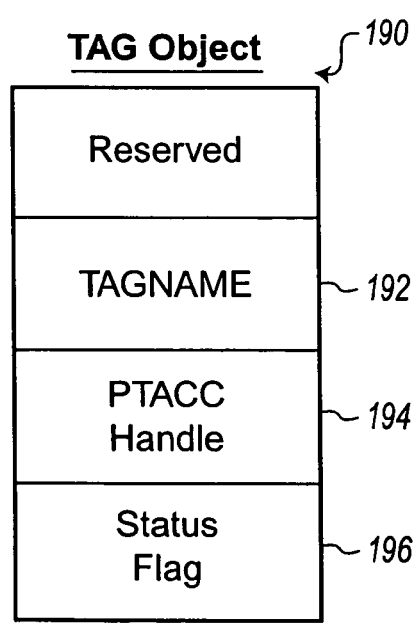
FIG. 7 shows a tag object of a type identified by a particular field of the property sink of FIG. 5.

Referring to FIG. 7, there is shown a tag object 190 of the type identified by field 184 of the property sink of FIG. 5. The tag object 190 includes a tagname field 192, PTACC handle field 194, and status flag field 196. The contents of the tagname field 192 will be identical to the contents of the tagname field 178 included within the property sink 168. In a preferred embodiment the PTACC handle field 194 provides a unique identifier for a particular tag. This identifier is returned by a dynamically linked library ("DLL") named "PTACC" to requesting third party applications.

Figure 8:
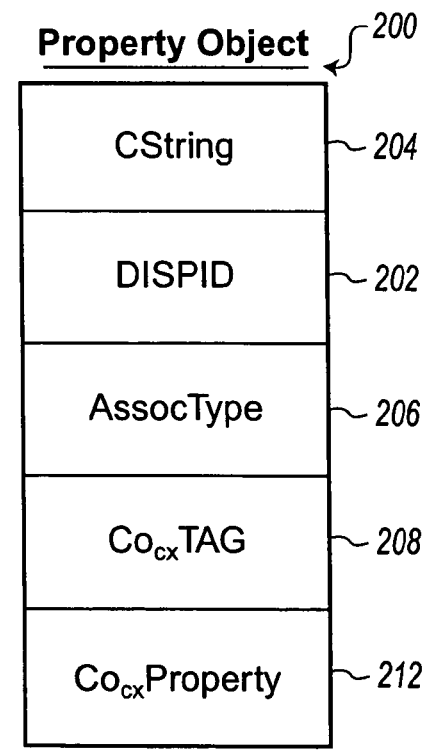
FIG. 8 provides a block diagram of the structure of a property object of the type identified by a particular field of the property sink of FIG. 5.

FIG. 8 provides a block diagram of the structure of a property object 200 of the type identified by field 180 of the property sink of FIG. 5. As is indicated by FIG. 8, the property object 200 includes a DISPID field 202 for identifying a particular parameter of the bound object (e.g., ActiveX control). In an exemplary implementation the industry standard dispatch interface ("IDispatch") of the bound object furnishes an index stored in the DISPID field in response to a call by the container application for a method of the bound object. The container application then calls an "Invoke" method of the object's dispatch interface, which causes the object to retrieve the method associated with the index in the DISPID field 202. The desired method is then called by the bound object.

The property object 200 further defines a "CString" field 204 for storing the name of the tag corresponding to the container property associated with such tag. Also included within the property object 200 is an "ASSOCTYPE" field 206 which records the type of association between such container property and tag. In addition, a "COcxTag" field 208 is provided for storing a pointer to an object wrapper surrounding methods used by the container application to interface with tags. The property object 200 also defines a "COcxProperty" field 212 for holding a pointer to an object wrapper surrounding methods for changing properties of the bound object.

Mapping Changes Between Corresponding Properties and Tags

Figure 9:
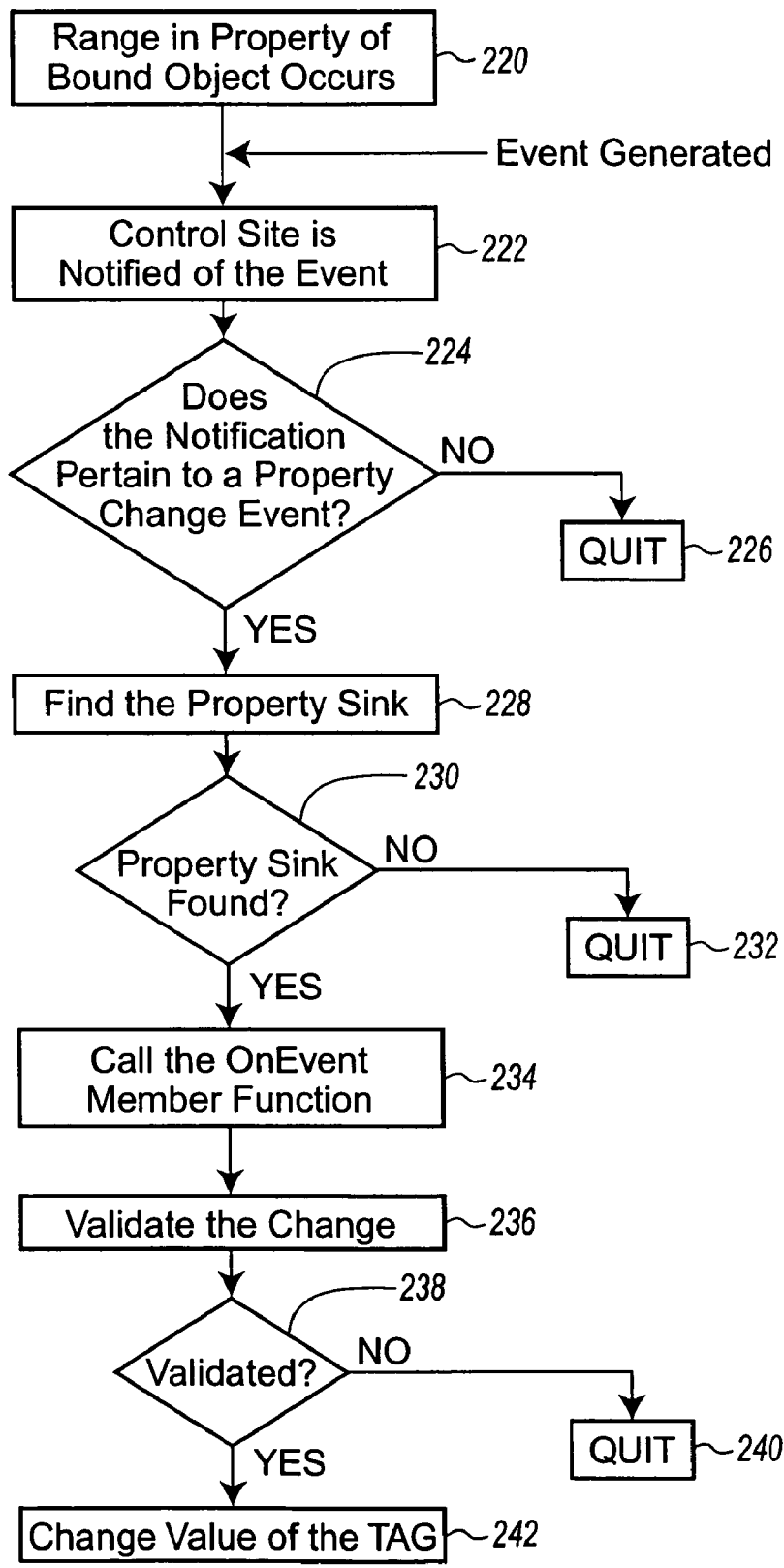
FIGS. 9 and 10 are respective flowchart representations of the manner in which changes in properties of a container application potentially induce corresponding changes in tags of an instantiated object, and vice versa.
Figure 10:
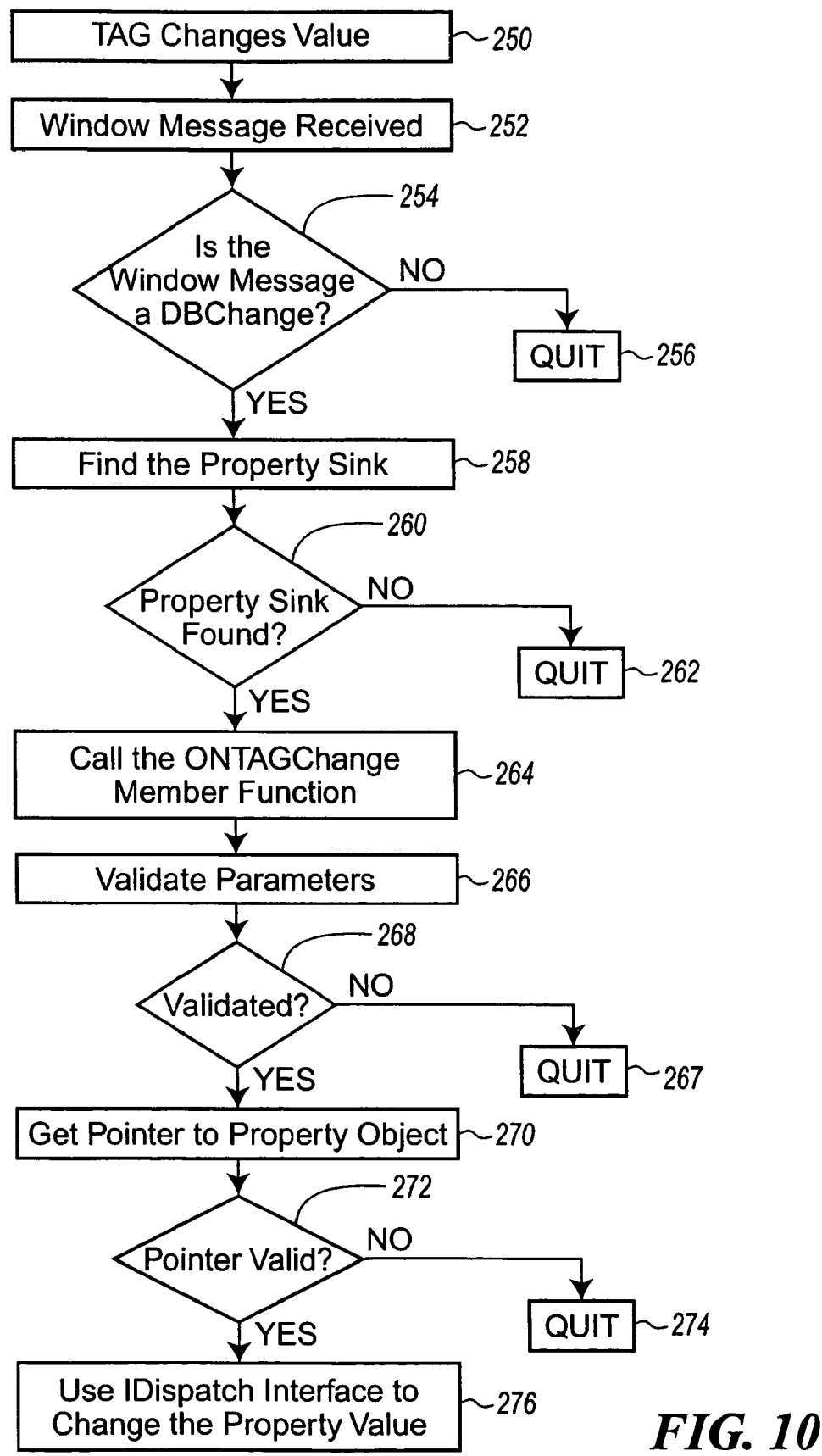

When a compiled window (described above) is loaded during execution of the container application, the property sinks 168 and event sinks 170 associated with the compiled window are regenerated and used to record any change in the operative association between properties of bound objects and corresponding tags of the container application. FIGS. 9 and 10 are respective flowchart representations of the manner in which changes in such properties potentially induce corresponding changes in such tags, and vice versa.

Referring to FIG. 9, in step 220 a property of a bound object is caused to change in state or value (i.e., a "property change") and the associated control site (FIG. 4) of the bound object is notified (step 222). It is then determined whether the notification received at the control site is with regard to a property change (step 224). If not, no further processing relating to a potential change in the value of an associated container tag is performed (step 226). If the notification corresponds to a property change, it is attempted to identify the property sink (FIG. 5) corresponding to the property being changed (step 228). If a corresponding property sink is not found (step 230), then no further processing is performed (step 232). In the case where a corresponding property sink is identified, an OnEvent member function is called (step 234). The OnEvent member function serves to convert the property change into a corresponding change in state or value of the associated tag (i.e., a "tag change").

In step 236, an operation is performed to validate the proposed tag change arising from the property change. In a preferred implementation this validation process entails determining whether the proposed tag change is within a predefined range of valid tag values. If the proposed change is not validated (step 238), no further processing is performed (step 240). In the case where the property change is validated, the container application makes the corresponding validated change in the associated tag (step 242).

Referring now to FIG. 10, in step 250 a tag change is experienced by a tag monitored by the container application and a notification message is generated in response. In step 254 it is then determined whether the notification message corresponds to an industry standard "DBCHANGE" message (i.e., a type of message which has been registered in the Windows environment to facilitate interpretation by a receiving application). If not, no further efforts are made to make a property change corresponding to the tag change (step 256). If the window message corresponds to a DBCHANGE message, it is attempted to identify the property sink (FIG. 5) associated with the tag experiencing a change (step 258). If an associated property sink is not found (step 260), then no further processing is performed (step 262). In the case where a corresponding property sink is identified, an OnTagChange member function is called (step 264). The OnTagChange member function serves to convert the tag change into a corresponding property change.

In step 266, an operation is performed to validate the parameters returned by the OnTagChange member function. In a preferred implementation this validation process entails determining whether the proposed property change falls within a predefined range. If the proposed change is not validated, no further processing is performed (step 267). In the case where the property change is validated (step 268), a pointer to the appropriate property object is retrieved from the associated property sink (step 270). If the retrieved pointer is invalid (step 272), then no further processing is performed (step 274). If a valid pointer has been retrieved, then a corresponding change is made in the associated property via an interface of the application program (step 276).

In a preferred implementation of the procedure set forth in FIG. 10, several object classes described in CODE SECTION I are invoked. Specifically, CTagServer and CocxTag are classes disposed to "wrap" various methods for interfacing with the tags monitored by the container application. Each "wrapper" instance of this class provides an interface between the container application and any proprietary methods for interfacing with such tags. The class CpropSink corresponds to a specific implementation of a property sink. The class CocxProperty is designed to wrap properties of control objects and to store pointers (i.e., IDispatch) associated locations of such properties. The SetValue member function uses the IDispatch pointer to change the value of a control object property associated with a tag experiencing a corresponding change. In CODE SECTION I, the "//" expression is used to identifies comments to the code.

Code Section I

CTagServer:

```
LRESULT CTagServer::WindowProc(UINT message, WPARAM
wParam, LPARAM lParam)
{
    if (message == m_DbChgMsg)
    {
        // interpret the lParam as a handle of a tag
        HPT hPt = (HPT) lParam;
        // Get the tag associated with this message.
        COcxTag* pTag = (COcxTag*) GetExtraLong(hPt,
0);
        if (!pTag)
            return false;
        // Get the sink associated with this tag.
        ITagChange* pSink = (ITagChange*)
GetExtraLong(hPt, sizeof(LONG));
        // if there is a sink call it else call tags
```

-continued

```
virtual method.
        if (pSink)
            pSink->OnTagChange(pTag);
        else
            pTag->OnTagChange(NULL);
        return TRUE;
    }
    return CWnd::WindowProc(message, wParam, lParam);
}
```

OnTagChange:

```
void CPropSink::OnTagChange(COcxTag*)
{
    // make sure there is a property object associated with this
tag
    // if not then initialize one
    if (!m_pProp)
        InitProperty( );
    // verify that there is a property, tag and that the
association between
    // the two indicates that the tag changes the property (this
relationship
    // is defined by the graphic on the property page when the
association
    // is defined)
    if (m_bIgnoreChange || !m_pProp || !m_pTag ||
        ((m_assocType != TAG_CHANGES_PROP) &&
        (m_assocType != BOTH)))
        return;
    // some flags here solve some timing problems intended to
solve
    // circular events. ie. Tag change property which changes
tag which
    // changes property...
    m_bIgnoreChange = true;
    m_pProp->SetValue(m_pTag->GetValue( ));
    m_bIgnoreChange = false;
```

Execution of Container Scripts in Response to Events

As is indicated by FIG. 3, the dialog box of a bound object represents any association existing between event occurrences in the object and scripts defined by the container application. In the exemplary embodiment of FIG. 3, a user may alter such associations by performing editing operations upon the dialog box displayed by the events page.

In CODE SECTION II below, exemplary code is provided for effecting the association of event occurrences to the execution of container scripts contemplated by the present invention. Specifically, CODE SECTION II includes the definition of a class "CScriptSink" disposed to facilitate implementation of the event sinks described with reference to FIG. 6. In particular, CScriptSink causes event notification messages generated by the bound object to be registered and sent to the container application. CODE SECTION II further includes definition of a class defined as "COcxItem", which is responsible for creating control sites in response to instantiation of bound objects as described above with reference to FIG. 4. Also defined is the member function "OnCmdMsg", which is operative to: (i) determine the type of an event notification which has occurred, (ii) locate the associated container script per the relationship defined in the applicable events page (e.g., FIG. 3), and (iii) cause execution of the associated script. Calls to the function OnCmdMsg may be made in accordance with the standard COM protocol.

Code Section II

COcxItem:

```
BOOL COcxItem::OnCmdMsg(UINT nID, int nCode, void* pExtra,
            AFX_CMDHANDLERINFO* pHandlerInfo)
{
    AFX_EVENT* pEvent = (AFX_EVENT*) pExtra;
    if (nCode == CN_EVENT && !m_bDesignMode)
    {
       COcxSink* pSink = NULL;
       switch (pEvent->m_eventKind)
       {
         case AFX_EVENT::event:
         {
           // get the event sinks
                    CString   sText;
           pSink = m_EventSinks.GetItem(pEvent->m_dispid);
           if(!pSink)
              return false;
           // create an event object
                    COcxEvent event(pEvent, this);
                    // Get the script name for the current event
                    sText = pSink->GetText( );
           // cause the script to execute
                    pSink->OnEvent(&event, sText);
           return true;
         }
                    //
                    // other cases here
                    //
       }
    }
    return CWnd::OnCmdMsg(nID, nCode, pExtra, pHandlerInfo);
}
```

CScriptSink:

```
void CScriptSink::OnEvent(COcxEvent* pEvent, CString szScriptName)
{
   CString   szComposed;
   CString   szEventName;
   UINT     dwParamCount;
   UINT     dwIndex;
   CString   szParamName;
   _variant_t vtParamValue;
   CEventTableUtil event;
   // essentially build up a structure that holds the types
       // and values for the script to execute properly
          szEventName = pEvent->GetEventName( );
   dwParamCount = pEvent->GetParamCount( );
   szComposed = szEventName;
   for (dwIndex = 0; dwIndex < dwParamCount; dwIndex++)
   {
      szParamName = pEvent->GetParamName(dwIndex);
      vtParamValue = pEvent->GetParamValue(dwIndex);
      szComposed += szParamName;
      event.AddNamedVariant((LPCSTR)szComposed, vtParamValue);
      szComposed = szEventName;
   }
       // register the message
       wWizardCallMsg =
       RegisterWindowMessage("InTouchWizardCallMsg");
       // send the registered message over to the main application
   OesExecuteScript(m_sText, pEvent->GetOcxInstanceName( ));
       // clear out the table of parameter information
   event.ResetContent( );
```

Although the above application has been described primarily in terms of particular implementations of techniques for creating associations between contained objects and various parameters of container applications, one skilled in the art will be able to develop alternative implementations based upon the teachings herein. Thus the application is meant only to be limited by the scope of the appended claims.

What is claimed is:

1. A method for creating a persistent association between a factory automation parameter of a container application operative within a computing environment and a property of a contained object instantiated within said computing environment, wherein said property relates to attributes of said contained object and said container application is configured to provide a visual interface representative of states of said factory automation parameter, said method comprising the steps of:

defining a persistent associative relationship between said factory automation parameter and said property, said persistent associative relationship being determinative of the extent to which changes in said factory automation parameter and said property will induce corresponding changes in the other; and recording said persistent associative relationship within a property sink of a control site of said container application, said control site being created upon instantiation of said contained object within said computing environment wherein said contained object facilitates provision of a visual indication of ones of said states of said factory automation parameter.

2. A system for creating a persistent association between a factory automation parameter of a container application operative within a computing environment and a property of a contained object instantiated within said computing environment, wherein said property relates to attributes of said contained object and said container application is configured to provide a visual interface representative of states of said factory automation parameter, said system comprising:

at least one processor;

memory operably coupled to the processor, wherein the processor executes instructions stored in the memory to:

define a persistent associative relationship between said factory automation parameter and said property, said persistent associative relationship being determinative of the extent to which changes in said factory automation parameter and said property will induce corresponding changes in the other wherein said contained object facilitates provision of a visual indication of ones of said states of said factory automation parameter; and record said persistent associative relationship in a property sink included within a control site associated with said container application.

3. A method for creating a persistent association between a tag source of a container application operative within a computing environment and a property of a contained object instantiated within said computing environment, wherein said property relates to attributes of said contained object and said container application is configured to provide a visual interface representative of states of monitored parameters of an industrial process, said method comprising the steps of:

defining a persistent associative relationship between said tag source and said property, said persistent associative relationship being determinative of the extent to which changes in said tag source and said property will induce corresponding changes in the other; and recording said persistent associative relationship within a property sink of a control site of said container application, said control site being created upon instantiation of said contained object within said computing environment wherein said contained object facilitates provision of a visual indication of ones of said states of at least one of said monitored parameters defined by said tag source.

4. A system for creating a persistent association between a tag source of a container application operative within a computing environment and a property of a contained object instantiated within said computing environment, wherein said property relates to attributes of said contained object and said container application is configured to provide a visual interface representative of states of monitored parameters of an industrial process, said system comprising:
- at least one processor;
- memory operably coupled to the processor, wherein the processor executes instructions stored in the memory to:
  - define a persistent associative relationship between said tag source and said property, said persistent associative relationship being determinative of the extent to which changes in said tag source and said property will induce corresponding changes in the other wherein said contained object facilitates provision of a visual indication of ones of said states of at least one of said monitored parameters defined by said tag source; and
  - record said persistent associative relationship in a property sink included within a control site associated with said container application.

5. A system for creating a persistent association between a parameter of a container application operative within a computing environment and a property of a contained object instantiated within said computing environment, said container application being configured to provide a visual interface representative of states of monitored parameters of an industrial process, said system comprising:
- at least one processor; and
- a memory operably coupled to the processor, wherein the processor executes instructions stored in the memory to record a persistent associative relationship in a property sink included within a control site associated with said container application, said persistent associative relationship being established between said parameter and said property during instantiation of said contained object within said computing environment wherein said contained object facilitates provision of a visual indication of ones of said states of at least one of said monitored parameters, said persistent associative relationship being determinative of the extent to which changes in said parameter and said property will induce corresponding changes in the other.

* * * * *